United States Patent [19]

Motooka et al.

[11] Patent Number: 4,616,059
[45] Date of Patent: Oct. 7, 1986

[54] GRAFT-MODIFIED ULTRAHIGH-MOLECULAR-WEIGHT POLYETHYLENE AND PROCESS FOR PRODUCING SAME

[75] Inventors: Masanori Motooka; Hitoshi Mantoku, both of Iwakuni, Japan

[73] Assignee: Mitsui Petrochemical Industries, Ltd., Tokyo, Japan

[21] Appl. No.: 770,058

[22] Filed: Aug. 28, 1985

[30] Foreign Application Priority Data

Aug. 30, 1984 [JP]   Japan ................................ 59-179214

[51] Int. Cl.$^4$ .............................................. C08K 5/01
[52] U.S. Cl. .................... 524/487; 264/176 F; 264/176 R; 264/210.5; 264/210.6; 264/210.8; 524/210; 524/284; 524/318; 524/354; 524/356; 524/379; 524/392; 525/285; 525/301
[58] Field of Search ................ 525/285, 301; 524/487, 524/284, 379, 210, 318, 392, 354, 356; 264/176 F, 176 R, 210.5, 210.6, 210.8

[56] References Cited

U.S. PATENT DOCUMENTS 3,928,497 12/1975 Ohmori et al. ....................... 525/260
4,134,927  1/1979 Tomoshige et al. ................ 525/285
4,489,194 12/1984 Hayashi ............................... 525/285

*Primary Examiner*—Melvyn I. Marquis
*Attorney, Agent, or Firm*—Sherman and Shalloway

[57] ABSTRACT

A graft-modified ultrahigh-molecular-weight polyethylene obtained by grafting (A) an ultrahigh-molecular-weight polyethylene having an inherent viscosity [η], determined at 135° C. in decalin, of at least 5 dl/g with (C) an unsaturated carboxylic acid graft-copolymerizable therewith or its graft-copolymerizable derivative, under melt-kneading condition in the presence of (B) an aliphatic compound having a melting point, determined by the DSC method, of at least 10° C. and a boiling point of at least 130° C., an amount of the component (C) grafted in said graft-modified ultrahigh-molecular-weight polyethylene being 0.01 to 10% by weight, and said graft-modified ultrahigh-molecular-weight polyethylene being substantially free of an insoluble gel product and having a tensile strength of at least 1.0 GPa; and a process for producing the same.

12 Claims, 4 Drawing Figures

GRAFT-MODIFIED ULTRAHIGH-MOLECULAR-WEIGHT POLYETHYLENE AND PROCESS FOR PRODUCING SAME

This invention relates to a graft-modified ultrahigh-molecular-weight polyethylene substantially free of an insoluble gel product, which has excellent stretchability as well as, in the form of a stretched shaped article, excellent tensile strength, excellent tensile modulus of elasticity, excellent dynamic modulus of elasticity, excellent elongation at break and the like with excellent balance, and which shows improved properties of reinforcing effect, adhesion and resistance to fibrillation compared with conventional non-graft-modified ultrahigh-molecular-weight polyethylene, making it possible to exhibit excellent performance as a reinforcing material of epoxy resin or other resins. Moreover, this invention relates to a process for producing said polyethylene.

More specifically, this invention relates to a graft-modified ultrahigh-molecular-weight polyethylene obtained by grafting (A) an ultrahigh-molecular-weight polyethylene having an inherent viscosity [η], determined at 135° C. in decalin, of at least 5 dl/g with (C) an unsaturated carboxylic acid graft-copolymerizable therewith or its graft-copolymerizable derivative, under melt-kneading condition in the presence of (B) an aliphatic compound having a melting point, determined by the DSC method, of at least 10° C. and a boiling point of at least 130° C., an amount of the component (C) grafted in said graft-modified ultrahigh-molecular-weight polyethylene being 0.01 to 10% by weight, and said graft-modified ultrahigh-molecular-weight polyethylene being substantially free of an insoluble gel product and having a tensile strength of at least 1.0 GPa. This invention further relates to a process for producing said polyethylene advantageously on an industrial scale.

It has been well known that a higher strength and a higher modulus of elasticity can be provided by spinning high-molecular-weight substances, e.g. polyolefins such as polyethylene and polypropylene, polyesters and polyamides and then stretching same. Above all, polyethylene has the highest theoretical value of the modulus of elasticity among varied high-molecular-weight substances. Besides, the modulus of elasticity of polyethylene fibers which have been put to practical use is not so high. Therefore, a difference in modulus of elasticity between the practical value and the theoretical value is great. For this reason, a large number of methods have been so far proposed to make the modulus of elasticity close to the theoretical value. Especially, if an ultrahigh-molecular-weight polyethylene having a higher molecular weight than general-purpose polyethylenes can be stretched at a higher ratio, a higher modulus of elasticity and a higher strength can also be expected. Accordingly, a method comprising forming an ultrahigh-molecular-weight polyethylene in a liquid solvent into a dilute solution having a concentration of about 2–10% by weight, then spinning the solution and stretching it at a high ratio has been proposed in Japanese Laid-Open Patent Publications No. 107506/80, No. 15408/81 (corresponding to British Pat. No. 2,051,667) and No. 5228/83.

When an attempt is made to use such a liquid solvent as a stretchability improver for ultrahigh-molecular-weight polyethylenes in continuous extrusion spinning from a screw extruder, the solvent and the powdery polyethylene cannot at all be mixed because of an excessively great difference in viscosity between the solvent and the powder. Moreover, since the solvent acts as a lubricant between the powder and the screw, the powder and the screw revolve together and extrusion becomes practically impossible. Even if extrusion can be effected, the extrudate cannot be stretched at all because it is not a uniform mixture. Furthermore, it is impossible to perform melt extrusion spinning continuously by a screw extruder. These solvents have relatively low boiling points and high flammability, and are dangerous to use in a screw extruder adapted to be electrically heated.

As a different technique, Japanese Laid-Open Patent Publication No. 17736/82 (published Oct. 30, 1982) discloses the use of a relatively low-molecular-weight polyethylene as a moldability improver.

Also known is Japanese Laid-Open Patent Publication No. 193319/82 (published Nov. 27, 1982) using as a moldability improver, for example, aliphatic hydrocarbons such as paraffin waxes and low-molecular-weight polyethylene having a molecular weight of about 1,000 to 10,000, alicyclic hydrocarbons such as cyclopentene, cyclopentadiene, cyclohexene-type polymers and polymers of $C_2$ fractions in petroleum refining, higher alcohols having at least 15 carbon atoms such as cetyl alcohol and stearyl alcohol, and aliphatic esters such as butyl oleate.

However, satisfactory results are hardly obtained even in the proposals of the latter group as detailed in European Laid-Open Patent Publication No. 0,115,192 (published Aug. 8, 1984).

Co-inventors including the present inventors have proposed in said European Laid-Open Patent Publication No. 0,115,192 a process that can provide stretched articles of ultrahigh-molecular-weight polyethylene having excellent properties by conquering the technological defects associated with the above conventional proposals.

The above proposal can provide a process for producing a stretched article of ultrahigh-molecular-weight polyethylene which comprises the following steps (1) to (4);

(1) melt-kneading a mixture composed of (A) 15 to 80 parts by weight, per 100 parts by weight of the components (A) and (B) combined, of ultrahigh-molecular-weight polyethylene having an inherent viscosity [η], determined at 135° C. in decalin, of at least 5 dl/g and (B) 85 to 20 parts by weight, per 100 parts by weight of the components (A) and (B) combined, of a paraffinic wax having a melting point, determined by the DSC method, of 40° to 120° C. and a weight average molecular weight ($\overline{M}w$), determined by the GPC method, of at least 230 but less than 2,000 in a screw extruder while maintaining the temperature of the mixture at 180° to 280° C., (2) melt-extruding the molten mixture through a die kept at a temperature of 180° to 300° C., (3) cooling the resulting unstretched extrudate to solidify it, and (4) subjecting the unstretched solidified extrudate to a stretching treatment at a temperature of 60° to 140° C. at a stretch ratio of at least about 3:1 when step (2) is carried out while a draft is applied to the unstretched extrudate or at a stretch ratio of at least about 10:1 when step (2) is carried out in the absence of a draft.

However, none of the above-described conventional proposals has an idea of utilizing a graft-modifying means to improve properties of an ultrahigh-molecular-weight polyethylene, for example, stretchability, adhesion, etc. Besides, a method of modifying polyethylene by mixing polyethylene with unsaturated carboxylic acid derivatives such as maleic anhydride with heating is disclosed in e.g. Japanese Patent Publication No. 6384/64. Nevertheless, even if such method is applied to an ultrahigh-molecular-weight polyethylene, said ultrahigh-molecular-weight polyethylene is, unlike general-purpose polyethylenes, hard to graft-modify with an extruder, etc. because it has an ultrahigh molecular weight and therefore a high melt viscosity. Further, as polyethylene causes a cross-linking reaction too at the point of graft-modification, the ultrahigh-molecular-weight polyethylene, even if modified by such method, comes to have a higher molecular weight and partially allows gelation, so that spinning and stretching are almost impossible.

Said Japanese Patent Publication No. 6384/64 has proposed, for producing modified polyethylene having more improved clarity, gloss, adhesion, wettability, dyeability and printability than starting polyethylene, a process for producing a solid modified ethylene homopolymer or copolymer which comprises reacting under heat an ethylene homopolymer or copolymer having a molecular weight of at least 10,000 and a density of about 0.910 g/cc to about 0.960 g/cc at about 225° C. to about 400° C. for about 0.5 to about 10 minutes under autogenous pressure. It shows a molecular weight of about 10,000 to about 3,000,000 or higher, and a molecular weight capable of including that of ultrahigh-molecular-weight polyethylene. However, an example of polyethylene having the high molecular weight in all Examples is only a general-purpose polyethylene having a melt index, determined by ASTM D-1238-52T, of 0.22 [inherent viscosity $[\eta]$, determined at 135° C. in decalin, of about 2.86 dl/g]. An ultrahigh-molecular-weight polyethylene having an inherent viscosity $[\eta]$, determined at 135° C. in decalin, of at least 5 dl/g intended by this invention has so high a molecular weight that a melt index cannot be measured according to ASTM D-1238-52T.

On the other hand, a process for graft-modifying polyethylene with maleic anhydride which comprises dissolving polyethylene in an alkyl aromatic hydrocarbon solvent in the presence of a radical initiator and feeding maleic acid at a specific feed rate to control the reaction is also known from Japanese Patent Publication No. 39636/77 (corresponding to U.S. Pat. No. 3,928,497). However, the ultrahigh-molecular-weight polyethylene has too high a molecular weight and cannot readily be dissolved in such solvent. If said process applies to the ultrahigh-molecular-weight polyethylene, a concentration of the solvent in the reaction must be much decreased, and it is not suited for industrial production including post-treatment.

The present inventors have made studies to remedy the above-noted technological problems of the conventional proposals and to provide an ultrahigh-molecular-weight polyethylene substantially free of an insoluble gel product, which has excellent stretchability as well as, in the form of a stretched shaped article, excellent properties with excellent balance, and which shows improved properties of reinforcing effect, adhesion and resistance to fibrillation.

As a consequence, they have succeeded in providing a graft-modified ultrahigh-molecular-weight polyethylene having the above properties which is not described in a hitherto known literature.

The present inventors have discovered, as a result of their studies, a graft-modified ultrahigh-molecular-weight polyethylene obtained by grafting (A) an ultrahigh-molecular-weight polyethylene having an inherent viscosity $[\eta]$, determined at 135° C. in decalin, of at least 5 dl/g with (C) an unsaturated carboxylic acid graft-copolymerizable therewith or its graft-copolymerizable derivative, under melt-kneading condition in the presence of (B) an aliphatic compound having a melting point, determined by the DSC method, of at least 10° C. and a boiling point of at least 130° C., an amount of the component (C) grafted in said graft-modified ultrahigh-molecular-weight polyethylene being 0.01 to 10% by weight, and said graft-modified ultrahigh-molecular-weight polyethylene being substantially free of an insoluble gel product and having a tensile strength of at least 1.0 GPa. Moreover, the above graft-modified ultrahigh-molecular-weight polyethylene has been found to have noticeable availability in the wide-ranging fields of engineering plastics, reinforcing materials, etc. as a new type of modified ultrahigh-molecular-weight polyethylene which has excellent properties with excellent balance and shows improved properties of reinforcing effect, adhesion and resistance to fibrillation.

Accordingly, an object of this invention is to provide a graft-modified ultrahigh-molecular-weight polyethylene which is not described in the hitherto known literature and a process for producing same.

The above object and many other objects as well as advantages of this invention will be more clear from the following description and the accompanying drawings in which FIG. 1 is a graphical representation of a typical relationship between amount of maleic anhydride grafted to high-molecular-weight polyethylene and melt-extruding temperature;

Figure 1:
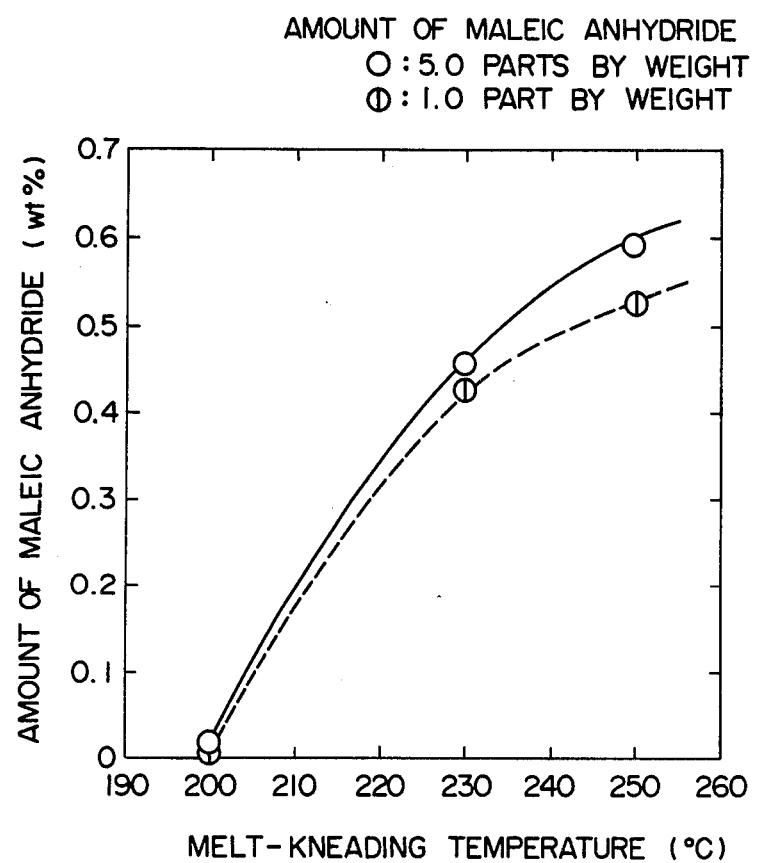

The ultrahigh-molecular-weight polethylene and a method for its production are known, and such polyethylene is commercially available.

The ultrahigh-molecular-weight polyethylene (A) used in this invention has an inherent viscosity $[\eta]$, determined at 135° C. in decalin, of at least 5 dl/g, preferably at least 7 dl/g, particularly 7 to 30 dl/g. When the inherent viscosity of the polyethylene is less than 5 dl/g, a stretched article having excellent tensile strength cannot be obtained by stretching the unstretched solidifed extrudate. There is no particular restriction on the upper limit of the inherent viscosity, but the upper limit is preferably 30 dl/g as exemplified above. If the inherent viscosity of the polyethylene is too high beyond 30 dl/g, the melt-spinnability of a mixture of such polyethylene and the aliphatic compound (B) in a screw extruder at the melt-kneading and extruding temperatures tends greatly to be reduced. The use of ultrahigh-molecular-weight polyethylene having an inherent viscosity of up to 30 dl/g is preferred.

The term "ultrahigh-molecular-weight polyethylene", as used in the present application, denotes not only a homopolymer of ethylene but also a copolymer of ethylene with up to 5% by weight of an alpha-olefin having at least 3 carbon atoms, preferably an alpha-olefin having 3 to 8 carbon atoms, such as propylene, butene-1, pentene, hexene, 4- methyl-1-pentene, or octene.

The aliphatic compounds (B) used in this invention has a melting point, determined by the DSC method, of at least 10° C., preferably 20° to 120° C., more preferably 40° to 100° C. and a boiling point of at least 130° C., preferably at least 160° C., more preferably at least 190° C.

If a liquid aliphatic compound having a melting point of less than 10° C. is used instead of the aliphatic compound (B), the ultrahigh-molecular-weight polyethylene (A) rotates as a unit with the screw, and uniform melt-kneading cannot be carried out. On the other hand, if the component (B) has a boiling point of less than 130° C., surging may occur within the screw extruder owing to the vaporization of the component (B), or abrupt foaming may occur in the molten extrudate which has left the die orifice.

A preferable example of the component (B) is a paraffinic wax having a melting point, measured by the DSC method, of 40° to 120° C., preferably 45° to 110° C., and a weight average molecular weight ($\overline{M}w$), measured by the GPC method, of at least 230 but less than 2,000, preferably less than 1,000, more preferably not more than 900, especially not more than 800.

The melting point determined by the DSC method, as referred to in this application, denotes the melting point measured by a differential scanning calorimeter (DSC) in accordance with ASTM D3417.

The weight average molecular weight ($\overline{M}w$) determined by the GPC method, as referred to in this application, denotes the weight average molecular weight measured by GPC (gel-permeation chromatography) under the following conditions.

Device: Model 150C, made by Waters Co.
Column: TSK GMH-6 (6 mm$\phi$×600 mm) made by Toyo Soda Co., Ltd.
Solvent: ortho-kdichlorobenzene (ODCB)
Temperature: 135° C.
Flow rate: 1.0 ml/min.
Injecting concentration: 30 mg/20 ml ODCB (the amount injected 400 microliters)

The column elution volume is corrected by the universal method using standard polystyrene made by Toyo Soda Co., Ltd. and Pressure Chemical Co.

The paraffinic wax (B) used in this invention may be any paraffinic wax which meets the above melting point and weight average molecular weight requirements specified above, and needs not be composed only of carbon and hydrogen. For example, it may have a minor amount of oxygen or other elements.

The paraffinic wax (B) may be a variety of substances containing as a main component saturated aliphatic hydrocarbon compounds having the aforesaid melting points and weight average molecular weights. Specific examples include n-alkanes having at least 22 carbon atoms such as docosane, tricosane, tetracosane and triacontane or mixtures of a major proportion of these n-alkanes with a minor proportion of lower n-alkanes; paraffin waxes separated from petroleum and purified; low pressure method, medium pressure method or high pressure method polyethylene waxes or ethylene copolymer waxes having a relatively low molecular weight which are obtained by polymerizing or copolymerizing ethylene or ethylene and another alpha-olefin and/or a diene; polyethylene or ethylene copolymer waxes obtained by reducing the molecular weights of polyethylene or ethylene copolymers having a relatively high molecular weight by such means as heat degradation; and oxidized waxes or alpha, beta-unsaturated acid-modified waxes such as the oxidation products or maleinized products of the above-exemplified waxes. From these paraffinic waxes, those having the above-specified melting points and weight average molecular weights are selected and used in the present invention.

The other example of the component (B) is an aliphatic compound having at least 80 carbon atoms, preferably 12 to 15 carbon atoms and a molecular weight of 130 to 2,000, preferably 200 to 800, selected from the group consisting of aliphatic carboxylic acids, aliphatic alcohols, aliphatic acid amides, aliphatic carboxylic acid esters, aliphatic mercaptans, aliphatic aldehydes and aliphatic ketones.

Concrete example of such component (B) are fatty acids such as capric acid, lauric acid, myristic acid, palmitic acid, stearic acid and oleic acid, aliphatic alcohols such as lauryl alcohol, myristyl alcohol, ceytl alcohol and stearyl alcohol, fatty acid amides such as capramide, lauric amide, palmitic amide and stearamide, and fatty acid esters.

The unsaturated carboxylic acid graft-copolymerizable with the component (A) or its graft-copolymerizable derivative (C) as used in this invention are a $C_3-C_5$ unsaturated carboxylic acid graft-copolymerizable with the component (A) or its graft-copolymerizable derivative such as acid anhydrides, acid halides, acid amines, acid imides and acid esters. Concrete examples of such component (C) are unsaturated carboxylic acids such as acrylic acid, maleic acid, fumaric acid, tetrahydrophthalic acid, itaconic acid, citraconic acid, crotonic acid, isocrotonic acid, nadic acid ® (endocis-bycyclo[2,2,1-]hept-5-ene-2,3-dicarboxylic acid); and derivatives such as malenyl chloride, maleimide, maleic anhydride, citraconic anhydride, monomethyl maleate, dimethyl maleate and glycidyl maleate. Of these, a $C_3-C_{15}$ unsaturated dicarboxylic acid or an acid anhydride thereof is preferable. Maleic acid and nadic acid or acid anyhdrides thereof are most preferable.

In the graft-modified ultrahigh-molecular-weight polyethylene of this invention obtained by grafting the component (A) with the component (C) under melt-kneading condition in the presence of the component (B), the amount of the component (C) grafted is 0.01 to 10% by weight, preferably 0.05 to 10% by weight. Said polyethylene is substantially free of an insoluble gel product and has a tensile strength of at least 1.0 GPa, preferably at least 1.5 GPa, for example, 1.0 to 6 GPa.

Where the amount of the component (C) grafted is less than 0.01% by weight, a satisfactory adhesion is not attainable. Where said amount is more than 10% by weight, no satisfactory adhesion is attainable too. In addition, stretchability worsens and an amorphous component increases, with the result that in the form of a stretched shaped article, a tensile modulus of elasticity and a tensile strength seem likely to decrease. Accordingly, the amount of the component (C) grafted is properly selected within the above range.

Moreover, since the graft-modified ultrahigh-molecular-weight polyethylene of this invention is substantially free of an insoluble gel product, it has excellent moldability and stretchability and can be uniformly processed through melt extrusion into films, stretched tapes and filaments having excellent properties. Moreover, said polyethylene can also be formed into a dilute solution having a concentration of about 2 to 10% by weight, which is then spun and stretched at a high ratio to afford a stretched product having excellent reinforcing property.

What this invention terms "an insoluble gel product" means a gel product left when 1 part by weight of a graft-modified ultrahigh-molecular-weight polyethylene is dissolved in 99 parts by weight of p-xylene at 120° C. under reflux and the solution is hot filtered. In this invention, "substantially free of an insoluble gel product" means that such gel product left is not observed with an unaided eye.

Moreover, the graft-modified ultrahigh-molecular-weight polyethylene of this invention has a tensile strength of at least 1.0 GPa. Where the tensile strength is less than 1.0 GPa, a reinforcing effect, adhesion and resistance of fibrillation are poor. Though the upper limit is not restricted in particular, it is usually up to 6 GPa as indicated above.

According to a preferable embodiment of the graft-modified ultrahigh-molecular-weight polyethylene in this invention, a tensile modulus of elasticity is at least 10 GPa, more preferably at least 20 GPa. Where the tensile modulus of elasticity is less than 10 GPa, the reinforcing effect, adhesion and resistance to fibrillation are less improved than in case of at least 10 GPa.

In the graft-modified ultrahigh-molecular-weight polyethylene of this invention, it is advisable for further improving the tensile modulus of elasticity and tensile strength that the residual amount of the component (B) is 5 to 0% by weight based on the total weight of the component (A), the residual amount of the component (B) and the component (C) grafted. The amount of the component (B) can easily be adjusted, as will be later described, by removal on elution or leaching with a solvent.

In accordance with preferable producing embodiments to give the graft-modified ultrahigh-molecular-weight polyethylene obtained by grafting the component (A) with the component (C) under melt-kneading condition in the presence of the component (B) in this invention, there can be provided a process for producing a graft-modified ultrahigh-molecular-weight polyethylene which comprises (1) melt-kneading a mixture composed of (A) 15 to 80 parts by weight, preferably 30 to 50 parts by weight, per 100 parts by weight of the components (A) and (B) combined, of an ultrahigh-molecular weight polyethylene having an inherent viscosity [$\eta$], determined at 135° C. in decalin , of at least 5 dl/g, (B) 85 to 20 parts by weight, preferably 70 to 50 parts by weight, per 100 parts by weight of the components (A) and (B) combined, of an aliphatic compound having a melting point, determined by the DSC method, of at least 10° C. and a boiling point of at least 130° C., and (C) at least 0.1 part by weight, preferably at least 0.5 part by weight, for example, 0.1 to 10 part by weight, per 100 parts by weight of the component (A), of an unsaturated carboxylic acid graft-copolymerizable with the component (A) or its graft-copolymerizable derivative, in a screw extruder while maintaining the mixture at a temperature ranging from the melting point of the mixture to 280° C., preferably from a point 10° C. above the melting point of the mixture to 250° C., and (2) melt-extruding the molten mixture through a die kept at a temperature ranging from the melting point of the mixture to 300° C., preferably from a point 10° C. above the melting point of the mixture to 270° C.

There is no particular restriction on the screw extruder used. For example, a single screw extruder, a multiple screw extruder and other various known-types of screw extruders can be used.

The die used can be properly selected according to the desired shape of the unstretched extrudate. For example, when a die of the spinneret type is used, filaments or strands can be obtained by melt extrusion. Or a tape, film or sheet can be molded by melt extrusion by using a lip die or a T-die for tapes, films, and sheets.

Where the melt-kneading temperature exceeds 280° C. or the die temperature exceeds 300° C., there is a fear that thermal degradation of the component (A) occurs.

When the amount of the ultrahigh-molecular-weight polyethylene (A) is less than 15% by weight, melt-kneading, especially, melt-kneading with a screw extruder is difficult and an extrudate of the mixture is chopped into lumps at the point of stretching, so that it is impossible to stretch the extrudate at a high stretch ratio or exert a draft thereon. On the other hand, when the amount exceeds 80% by weight, a melt viscosity goes high and melt-kneading is difficult, making it impossible to obtain a uniform modified product. In case a stretched product is provided, an unstretched extrudate (strand) has a notable surface roughness which is apt to cause breakage in the stretching.

Where the amount of the component (C) is less than 0.1 part by weight, the amount of it grafted to the ultrahigh-molecular-weight polyethylene (A) is substantially small and a reinforcing effect of the stretched product is not improved.

In order to increase a graft efficiency of the component (C) to the component (A) when melt-kneading the mixture composed of the components (A), (B) and (C), a radical initiator can be co-existent. The amount of the radical initiator added can be properly selected, and is, for example, 0.001 to 1 part by weight, preferably 0.005 to 0.5 part by weight per 100 parts by weight of the component (A).

Examples of such radical initiator are organic peroxides and organic peresters, for example, benzoyl peroxide, dichlorobenzoyl peroxide, dicumyl peroxide, di-tert-butyl peroxide, 2,5-di(peroxide benzoate)hexine-3, 1,4-bis(tert-butylperoxyisopropyl)benzene, lauroyl peroxide, tert-butyl peracetate, 2,5-dimethyl-2,5-di(tert-butylperoxy)hexine-3, 2,5-dimethyl-2,5-di(tert-butylperoxy)hexane, tert-butyl perbenzoate, tert-butyl perphenylacetate, tert-butyl perisobutylate, tert-butyl per-sec-octoate, tert-butyl perpivarate, cumyl perpivarate and tert-butyl perdiethylacetate; and azo compounds, for example, azobisisobutylonitrile and dimethylazoisobutylate. Of these, dicumyl peroxide, di-tert-butyl peroxide, 2,5-dimethyl-2,5-di(tert-butyl-peroxy)-hexine-3, 2,5-dimethyl-2,5-di(tert-butylperoxy)hexane and 1,4-bis(tert-butylperoxyisopropyl)benzene are preferable.

In addition to the above preferable producing embodiment with the screw extruder, an optional melt-kneading means by which the component (C) can be grafted to the component (A) under melt-kneading condition in the presence of the component (B) is available to produce the graft-modified ultrahigh-molecular-weight polyethylene in this invention. An example of such optional melt-kneading means is a method wherein melt-kneading is carried out by a device such as a Henschel mixer, V-blender, ribbon blender or tumbler blender under conditions of amounts of components (A), (B) and (C) and melt-kneading temperatures mentioned in (1) melt-kneading of the above preferable embodiment. After mixing with such device, melt-kneading and melt-extruding can also be conducted following the foregoing preferable embodiment.

The melt-kneaded product that can be obtained as above may be, for example, pelletized to form a pelletized graft-modified ultrahigh-molecular-weight polyethylene or melt shaped into a desirous shaped article. If one desires to obtain the graft-modified product afforded by the above preferable producing embodiment in the for of a stretched shaped article, it can be achieved by conducting the following steps (3) and (4):

(3) cooling the resulting unstretched extrudate to solidify it, and (4) subjecting the unstretched solidified extrudate to a stretching treatment at a temperature ranging from the melting point, determined by the DSC method, of the component (B) to a point 20° C. above the melting point of the mixture at a stretch ratio of at least about 3:1 when step 2 is carried out while a draft is applied to the unstretched extrudate or at a stretch ratio of at least about 10:1 when step (2) is carried out in the absence of a draft.

In performing step (3), the as-formed unstretched extrudate before cooling can be melt-extruded as described above under a draft, and this gives better results. Means for applying a draft to the as-formed unstretched extrudate are known, and can be utilized in the process of this invention. A draft can be applied by taking up the extrudate at a higher take-up linear speed than the extrusion linear speed in step (2). According to one embodiment, in subjecting the unstretched extrudate formed by melt extrusion in step (2) to the cooling and solidification treatment in step (3), a drafting action can be exerted on the as-formed unstretched extrudate by taking up its cooled product solidified to such an extent as can be taken up, at a larger take-up linear speed than the melt-extrusion linear speed. For example, as shown in Examples given hereinbelow, an air gap of a suitable desired distance is provided between the melt-extrusion die and a cooling medium, for example, the water surface of a cooling tank containing cold water, for cooling and solidifying the unstretched extrudate extruded from the die, and the unstretched extrudate is taken up by a take-up roll or bar disposed in the cold water and cooled and solidified. By taking up the unstretched extrudate at a larger take-up linear speed than the extrusion linear speed of the molten mixture of (A), (B) and (C) from the die, a drafting action can be exerted on the unstretched extrudate.

When a draft is to be exerted on the unstretched extrudate by melt extrusion in the process of this invention, the draft ratio is more than 1, preferably not less than 2.

In the present invention, the draft ratio denotes a ratio represented by the following formula:

Draft ratio = $v/v_o$.

$v_o$ ... Extrusion linear speed of the molten mixture in the die orifice $v$ ... Take-up linear speed of an extrudate cooled and solidified.

Cooling and solidification in step (3) of the process of this invention can be carried out by any desired means by which the unstretched extrudate formed by step (2) on which a draft has been, or has not been, exerted as above, can be cooled and solidified. For example, it can be carried out by contacting the extrudate with a gaseous cooling medium such as cooled air or a cooled inert gas, a liquid cooling medium such as cold water, or other suitable cooling media. The cooling temperature is, for example, about −20° C. to about 60° C.

In step (4) of the process of this invention, the solidified product obtained in step (3) is subjected to stretching treatment. The solidified unstretched extrudate is subjected to a stretching treatment at a temperature ranging from the melting point, determined by the DSC method, of component (B) to a point 20° C. above the melting point of the mixture, e.g. 60° to 140° C., preferably 100° 135° C. at a stretch ratio of at least about 3:1, for example from 3:1 to 50:1, when the above melt-extrusion is effected while applying a draft to the resulting unstretched extrudate, and at a stretch ratio of at least about 10:1, for example from 10:1 to 100:1 when the melt-extrusion is effected without application of a draft. The stretch ratio can be varied properly depending upon not only the presence or absence of drafting but also the draft ratio, the type of the compound (B), etc. If the stretching temperature is below the above-specified lower limit, it is difficult to stretch the extrudate at the desired stretch ratio. If, on the other hand, it is higher than the specified upper limit, the ultrahigh-molecular-weight polyethylene (A) becomes too soft and a stretched article having a high modulus of elasticity cannot be obtained although the extrudate can be stretched.

The treatment can be performed at the above temperature by stretching means known per se. For example, in the case of a filament or strand, a pair of godet rolls may be used for example, and the relative linear speed of the godet rolls is properly changed and selected so that stretching is effected at the desired stretch ratio. A film or tape, on the other hand, is stretched by using a pair of snap rolls, for example. Hot stretching may be carried out in an atmosphere of a heat medium, for example in an atmosphere of heated air, steam, a heated liquid, etc. Or it can be carried out by using heat waves or a hot plate. These means may be used in combination.

Preferably, the hot stretching is carried out in an atmosphere of a heat medium. It is especially preferred to use as the heat medium a solvent (liquid medium) which can dissolve the component (B) or the component (B) and the unreactive component (C) if present to remove it by leaching and has a boiling point higher than the stretching temperature employed, preferably a boiling point at least about 10° C. higher than the stretching temperature employed. Examples of the liquid medium are decalin, decane and kerosene. By employing this preferred embodiment, the excess of the component (B) or the component (B) and the unreacted component (C) if present can be removed by extraction or leaching simultaneously with the stretching treatment, and it becomes possible to reduce unevenness in stretching and perform stretching at a high stretch ratio. Of course, the excess of the component (B) or the component (B) and the unreacted component (C) if present may be removed by other means. For example, it can be achieved by treating the solidified unstretched extrudate with such a solvent as hexane, heptane, hot ethanol, chloroform, benzene, etc. prior to the stretching treatment. Or the stretched product may be subjected to a similar solvent treatment.

If in step (4), the stretch ratio in the aforesaid solvent is less than 3:1 in stretching the solidified product of the unstretched extrudate obtained under a draft, it is frequently the case that the tensile strength and the modulus of elasticity of the stretched article increase only to a small extent, and stretching unevenness occurs in the stretched article to degrade its appearance. On the other hand, if in step (4), the stretch ratio in the aforesaid solvent is less than 10:1 in stretching the solidified product of the unstretched extrudate obtained without applying a draft, it is frequently the case that the tensile strength and the modulus of elasticity of the stretched product increase only to a small extent and the polyethylene in the stretched article is whitened to degrade the appearance of the stretched article.

The stretching treatment in step (4) needs not be performed in one stage. If desired, it can be performed in a multiplicity of stages. When the latter is employed, the stretch ratio specified in step (4) of the process of this invention denotes the total of stretch ratios in the individual stages. The final stretching speed in the stretching treatment is not particularly restricted. But from the viewpoint of productivity, it is preferably at least 3 m/min., more preferably at least 5 m/min. Usually, the stretching is carried out monoaxially in the extruding direction (machine direction). In the case of a film or sheet, the stretching may further be carried out in the transverse direction (biaxial stretching). The stretching in the transverse direction can be carried out under the same conditions as described above except that the stretch ratio is set at 1.5:1 or higher, preferably at 2:1 or higher.

If desired, the stretched articles of a graft-modified ultrahigh-molecular-weight polyethylene of this invention may contain other additives. These additives are preferably blended with the polyethylene (A) or the mixture of the polyethylene (A), and the components (B) and (C) in step (1). If desired, however, they may be added and mixed during melt-kneading in the screw extruder.

These additives may be various additives conventionally used for polyolefins, for example heat stabilizers, weatherability stabilizers, coloring agents and fillers. The amounts of these additives blended may be properly selected within the ranges which do not impair the objects of this invention. For example, they are about 0.01 to about 1% by weight for the heat stabilizers, about 0.01 to about 2% by weight for the weatherability stabilizers, and about 0.01 to about 5% by weight for the coloring agents.

Examples of the heat stabilizers are phenolic compounds such as 2,6-di-tert-butyl-4-methylphenol and 2,2-thiobis-(6-tert-butyl-4-methylphenol) and amine compounds such as phenyl-1-naphthylamine.

An example of the weatherability stabilizers is 2-(2-hydroxyphenyl)benzotriazole.

Examples of the coloring agent or fillers are phthalocyanine pigments, nitroso lake pigments, titanium oxide, zinc oxide, precipitated silica, and carbon black.

Moreover, hydrocarbon polymers having a low softening point which are used for tacky tapes, coatings and hot melt adhesives may be added to the component (B) as resins to impart tackiness so far as they do not impair the object of this invention.

In the graft-modified ultrahigh-molecular-weight polyethylene of this invention, not only an adhesion of an ultrahigh-molecular-weight polyethylene being a nonpolar polymer is improved but also excellent properties of abrasion resistance and mechanical strength inherent in the ultrahigh-molecular-weight polyethylene are maintained. Therefore, said graft-modified ultrahigh-molecular-weight polyethylene is formed into films or sheets which are combined with polar materials such as metals, polyesters, polyamides, ethylene-vinyl acetate copolymer saponified substances, etc. to give various industrial materials. Or laminates of its injection-molded articles and said polar materials are also available as industrial parts.

The stretched product of the graft-modified ultrahigh-molecular-weight polyethylene in this invention has high tensile strength not found in the conventional polyethylene stretched product and high modulus of elasticity as well as a functional group compared with the stretched product of the usual non-graft-modified ultrahigh-molecular-weight polyethylene so that it is excellent in reinforcing effect, adhesion and resistance to fibrillation and can provide a molded article having excellent mechanical properties and excellent dimensional stability by compounding it with epoxy resins and unsaturated polyesters. Moreover, said ultrahigh-molecular-weight polyethylene is useful owing to light weight in particular compared with molded articles using ordinary reinforcing materials such as glass fibers, carbon fibers, boron fibers, aromatic polyamide fibers and aromatic polyimide fibers. Like composite materials using glass fibers, etc., it allows molding of a UD (unit directional) laminated sheet, SMC (sheet molding compound) and BMC (bulk molding compound). Thus, applications of said polyethylene to varied composite materials having a light weight and a high strength, such as automobile parts, structures of boat and yacht and substrates for electron circuits, are expected.

Moreover, the process of this invention makes easy the modification with unsaturated carboxylic acids or its derivatives which can hardly be done by the conventional process because the melt viscosity of ultrahigh-molecular-weight polyethylene is extremely high. Accordingly, ultrahigh-molecular-weight polyethylene stretched products having excellent adhesion with other substances, e.g. epoxy resins, unsaturated polyester resins, phenolic resins, urea resins, melamine resins, resorcinol resins and phenol resorcinol resins, excellent reinforcing property and excellent resistance to fibrillation are easily obtainable and therefore profitably available for the above applications.

The following Examples illustrate this invention in more detail. However, this invention is not limited to those Examples unless the scope of this invention is deviated.

EXAMPLE 1

[Production of an ultrahigh-molecular-weight polyethylene stretched product]

To a 30:70 blend of ultrahigh-molecular-weight polyethylene (Hizex Million ®145M ($[\eta]$ 8.20 dl/g), a trade name for a product of Mitsui Petrochemical Industries, Ltd.) and a paraffin wax (melting point 69° C., molecular weight 460) was added 1.0 part by weight, per 100 parts by weight of the ultrahigh-molecular-weight polyethylene, of maleic anhydride. The mixture was formed into an ultrahigh-molecular-weight polyethylene stretched product under the following conditions.

Powders of the ultrahigh-molecular-weight polyethylene, the paraffin wax and maleic anhydride were mixed and melt-extruded at a resin temperature of 200° C. by means of a screw extruder having a screw diameter of 20 mm$\phi$ and an L/D ratio of 20. Subsequently, the molten mixture was extruded through a die having an orifice diameter of 2.0 mm and solidified in air of room temperature with an air gap of 20 cm. At this time, an extrusion speed of the molten resin was 0.1 m/min, and a draft was applied so that a take-up speed became 2.0 m/min. That is, a draft ratio was set at 20. Successively, the extrudate was stretched by two pairs of godet rolls in a stretching tank (inside temperature 130° C., length 40 cm) using n-decane as a heat medium.

In the stretching operation, the rotating speed of a first godet roll was adjusted to 0.5 m/min., and by changing the rotating speeds of a second and a third godet roll, filaments having different stretch ratios were obtained. Each of the filaments was first stretched at a stretch ratio of 8.0 by the second godet roll, and then further stretched at a predetermined stretch ratio by the third godet roll. The stretch ratio was calculated from the rotation ratio of the godet rolls.

Table 1 indicates dynamic moduli of elasticity, tensile moduli of elasticity, tensile strengths and elongations at break of the filaments obtained at the various stretch ratios.

The dynamic modulus of elasticity was measured at room temperature (23° C.) and a vibration of 110 Hz by means of a dynamic viscosoelasticity measuring instrument (Vibron DDV-II, supplied by Toyo Baldwin Company). The tensile modulus of elasticity, tensile strength and elongation at break were measured at room temperature (23° C.) by means of an Instron Universal tester (Model 1123, supplied by Instron Company). At this time, the length of a sample between clamps was adjusted to 100 mm, and the speed of pulling, to 100 mm/min. The tensile strength was calculated by using the stress measured at 2% strain. The cross-sectional area of the filament, required for the calculation, was determined by measuring the weight and length of the filament assuming that the density of polyethylene was 0.96 g/cm$^3$.

TABLE 1

| | Stretch ratio | | | | | |
|---|---|---|---|---|---|---|
| Run No. | 8.0 / 1 | 10.0 / 2 | 11.8 / 3 | 14.0 / 4 | 14.9 / 5 | 16.3 / 6 |
| Dynamic modulus of elasticity (GPa) | 45.3 | 72.8 | 88.4 | 105.3 | 114.0 | 118.1 |
| Tensile modulus of elasticity (GPa) | 11.5 | 23.0 | 29.2 | 38.2 | 41.3 | 44.2 |
| Tensile strength (GPa) | 1.38 | 1.64 | 1.86 | 2.07 | 2.24 | 2.28 |
| Elongation at break (%) | 11.3 | 8.2 | 6.7 | 5.6 | 5.6 | 5.5 |

EXAMPLE 2

[Production of an ultrahigh-molecular-weight polyethylene stretched product]

To a 30:70 blend of ultrahigh-molecular-weight polyethylene (Hizex Million ®145M ([$\eta$] 8.20 dl/g), a trade name for a product of Mitsui Petrochemical Industries, Ltd.) and a paraffin wax (melting point 69° C., molecular weight 460) was added 5 parts by weight, per 100 parts by weight of the ultrahigh-molecular-weight polyethylene, of maleic anhydride. The mixture was formed into an ultrahigh-molecular-weight polyethylene stretched product under the same conditions as in Example 1.

Table 2 indicates dynamic moduli of elasticity, tensile moduli of elasticity, tensile strengths and elongations at break of the filaments obtained at the various stretch ratios.

TABLE 2

| | Stretch ratio | | | | | |
|---|---|---|---|---|---|---|
| Run No. | 8.0 / 7 | 9.7 / 8 | 12.1 / 9 | 14.0 / 10 | 14.8 / 11 | 15.7 / 12 |
| Dynamic modulus of elasticity (GPa) | 48.5 | 70.4 | 90.3 | 85.4 | 110.4 | 118.5 |
| Tensile modulus of elasticity (GPa) | 12.7 | 20.8 | 29.5 | 27.0 | 40.5 | 44.3 |
| Tensile strength (GPa) | 1.42 | 1.62 | 1.88 | 2.00 | 2.15 | 2.23 |
| Elongation at break (%) | 10.7 | 8.4 | 6.6 | 6.0 | 5.8 | 5.4 |

EXAMPLE 3

[Production of an ultrahigh-molecular-weight polyethylene stretched product]

To a 30:70 blend of ultrahigh-molecular-weight polyethylene (Hizex Million ® 145M ([$\eta$]8.20 dl/g), a trade name for a product of Mitsui Petrochemical Industries, Ltd.) and a paraffin wax (melting point 69° C. molecular weight 460) was added 1.0 part by weight, per 100 parts by weight of the ultrahigh-molecular-weight polyethylene, of maleic anhydride. The mixture was formed into an ultrahigh-molecular-weight polyethylene stretched product under the same conditions as in Example 1 except that the resin temperature in the screw extruder was 230° C.

Table 3 indicates dynamic moduli of elasticity, tensile moduli of elasticity, tensile strengths and elongations at break of the filaments obtained at the various stretch ratios.

TABLE 3

| | Stretch ratio | | | | | |
|---|---|---|---|---|---|---|
| Run No. | 8.0 / 13 | 10.2 / 14 | 12.3 / 15 | 14.3 / 16 | 14.7 / 17 | 15.4 / 18 |
| Dynamic modulus of elasticity (GPa) | 40.3 | 72.4 | 94.7 | 103.4 | 108.9 | 110.3 |
| Tensile modulus of elasticity (GPa) | 11.8 | 24.3 | 31.9 | 38.5 | 40.3 | 43.6 |
| Tensile strength (GPa) | 1.43 | 1.62 | 1.92 | 2.10 | 2.18 | 2.24 |
| Elongation at break (%) | 10.5 | 8.1 | 6.5 | 5.8 | 5.7 | 5.4 |

EXAMPLE 4

[Production of an ultrahigh-molecular-weight polyethylene stretched product]

To a 30:70 blend of ultrahigh-molecular-weight polyethylene (Hizex Million ®145M ([$\eta$]8.20 dl/g), a trade name for a product of Mitsui Petrochemical Industries, Ltd.) and a paraffin wax (melting point 69° C., molecular weight 460) was added 5.0 parts by weight, per 100 parts by weight of the ultrahigh-molecular-weight polyethylene, of maleic anhydride. The mixture was formed into an ultrahigh-molecular-weight polyethylene stretched product under the same conditions as in Example 1 except that the resin temperature in the screw extruder was 230° C.

Table 4 indicates dynamic moduli of elasticity, tensile moduli of elasticity, tensile strengths and elongations at break of the filaments obtained at the various stretch ratios.

TABLE 4

| | Stretch ratio | | | | | |
|---|---|---|---|---|---|---|
| | 8.0 | 10.3 | 12.1 | 13.9 | 15.0 | 15.4 |
| Run No. | 19 | 20 | 21 | 22 | 23 | 24 |
| Dynamic modulus of elasticity (GPa) | 48.4 | 75.1 | 89.6 | 104.3 | 108.5 | 113.4 |
| Tensile modulus of elasticity (GPa) | 12.5 | 23.8 | 29.8 | 35.6 | 41.8 | 43.1 |
| Tensile strength (GPa) | 1.43 | 1.70 | 1.89 | 2.08 | 2.16 | 2.23 |
| Elongation at break (%) | 11.5 | 8.4 | 7.4 | 6.2 | 5.7 | 5.6 |

EXAMPLE 5:

[Production of an ultrahigh-molecular-weight polyethylene stretched product]

To a 30:70 blend of ultrahigh-molecular-weight polyethylene (Hizex Million ®145M ([η]8.20 dl/g, a trade name for a product of Mitsui Petrochemical Industries, Ltd.) and a paraffin wax (melting point 69° C., molecular weight 460) was added 1.0 parts by weight, per 100 parts by weight of the ultrahigh-molecular-weight polyethylene, of maleic anhydride. The mixture was formed into an ultrahigh-molecular-weight polyethylene stretched product under the same conditions as in Example 1 except that the resin temperature in the screw extruder was 250° C.

Table 5 indicates dynamic moduli of elasticity, tensile moduli of elasticity, tensile strengths and elongations at break of the filaments obtained at the various stretch ratios.

TABLE 5

| | Stretch ratio | | | | | |
|---|---|---|---|---|---|---|
| | 8.0 | 9.6 | 10.8 | 14.1 | 15.0 | 16.2 |
| Run No. | 25 | 26 | 27 | 28 | 29 | 30 |
| Dynamic modulus of elasticity (GPa) | 36.5 | 52.3 | 60.3 | 74.8 | 84.6 | 85.8 |
| Tensile modulus of elasticity (GPa) | 10.4 | 15.0 | 18.1 | 23.6 | 26.4 | 28.7 |
| Tensile strength (GPa) | 1.28 | 1.35 | 1.41 | 1.56 | 1.57 | 1.64 |
| Elongation at break (%) | 12.7 | 9.6 | 8.3 | 6.4 | 6.3 | 5.7 |

EXAMPLE 6:

[Production of an ulrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) was added 5.0 parts by weight, per 100 parts by weight of the ultrahigh-molecular-weight polyethylene, of maleic anhydride. The mixture was formed into an ultrahigh-molecular-weight polyethylene stretched product under the same conditions as in Example 1 except that the resin temperature in the screw extruder was 250° C.

Table 6 indicates dynamic moduli of elasticity, tensile moduli of elasticity, tensile strengths and elongations at break of the filaments obtained at the various stretch ratios.

TABLE 6

| | Stretch ratio | | | | | |
|---|---|---|---|---|---|---|
| | 8.0 | 10.1 | 12.0 | 14.0 | 15.3 | 15.5 |
| Run No. | 31 | 32 | 33 | 34 | 35 | 36 |
| Dynamic modulus of elasticity (GPa) | 35.6 | 56.3 | 69.8 | 77.3 | 86.4 | 89.8 |
| Tensile modulus of elasticity (GPa) | 9.6 | 15.6 | 20.4 | 24.6 | 28.7 | 28.3 |
| Tensile strength (GPa) | 1.21 | 1.36 | 1.42 | 1.51 | 1.57 | 1.55 |
| Elongation at break (%) | 12.8 | 9.4 | 7.4 | 6.5 | 5.8 | 5.4 |

EXAMPLE 7:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 1.0 part by weight of maleic anhydride and 0.01 part by weight of dicumyl peroxide, per 100 parts by weight of the ultrahigh-molecular-weight polyethylene. The mixture was formed into an ultrahigh-molecular-weight stretched product under the same conditions as in Example 1.

Table 7 indicates dynamic moduli of elasticity, tensile moduli of elasticity, tensile strengths and elongations at break of the filaments obtained at the various stretch ratios.

TABLE 7

| | Stretch ratio | | | | | |
|---|---|---|---|---|---|---|
| | 8.0 | 9.8 | 12.0 | 14.1 | 15.2 | 16.1 |
| Run No. | 37 | 38 | 39 | 40 | 41 | 42 |
| Dynamic modulus of elasticity (GPa) | 48.5 | 72.8 | 90.4 | 107.5 | 113.4 | 120.2 |
| Tensile modulus of elasticity (GPa) | 12.7 | 22.4 | 29.2 | 38.1 | 42.3 | 45.4 |
| Tensile strength (GPa) | 1.41 | 1.66 | 1.92 | 2.13 | 2.20 | 2.29 |
| Elongation at break (%) | 10.3 | 8.2 | 6.7 | 5.8 | 5.4 | 5.1 |

EXAMPLE 8:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 5.0 parts by weight of maleic anhydride and 0.01 part by weight of dicumyl peroxide, per 100 parts by weight of the ultrahigh-molecular-weight polyethylene. The mixture was formed into an ultrahigh-molecular-weight stretched product under the same conditions as in Example 1.

Table 8 indicates dynamic moduli of elasticity, tensile moduli of elasticity, tensile strengths and elongations at break of the filaments obtained at the various stretch ratios.

TABLE 8

| Run No. | Stretch ratio | | | | | |
|---|---|---|---|---|---|---|
| | 8.0 43 | 9.8 44 | 12.1 45 | 14.3 46 | 15.0 47 | 15.3 48 |
| Dynamic modulus of elasticity (GPa) | 56.3 | 73.5 | 93.4 | 110.8 | 111.4 | 115.2 |
| Tensile modulus of elasticity (GPa) | 13.4 | 22.5 | 31.4 | 40.2 | 41.7 | 42.8 |
| Tensile strength (GPa) | 1.27 | 1.64 | 1.86 | 2.07 | 2.15 | 2.20 |
| Elongation at break (%) | 10.8 | 8.2 | 7.0 | 5.6 | 5.3 | 5.3 |

EXAMPLE 9:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 5.0 parts by weight of maleic anhydride and 0.03 part by weight of dicumyl peroxide, per 100 parts by weight of the ultrahigh-molecular-weight polyethylene. The mixture was formed into an ultrahigh-molecular-weight stretched product under the same conditions as in Example 1.

Table 9 indicates dynamic moduli of elasticity, tensile moduli of elasticity, tensile strengths and elongations at break of the filaments obtained at the various stretch ratios.

TABLE 9

| Run No. | Stretch ratio | | | | | |
|---|---|---|---|---|---|---|
| | 8.0 49 | 9.8 50 | 12.1 51 | 14.0 52 | 15.2 53 | 16.4 54 |
| Dynamic modulus of elasticity (GPa) | 46.0 | 70.3 | 92.4 | 105.3 | 110.1 | 121.4 |
| Tensile modulus of elasticity (GPa) | 11.6 | 21.5 | 30.2 | 38.4 | 42.7 | 47.3 |
| Tensile strength (GPa) | 1.32 | 1.65 | 1.92 | 2.10 | 2.21 | 2.29 |
| Elongation at break (%) | 10.8 | 8.2 | 6.8 | 5.7 | 5.4 | 5.1 |

EXAMPLE 10:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 5.0 parts by weight of maleic anhydride and 0.05 parts by weight of dicumyl peroxide, per 100 parts by weight of the ultrahigh-molecular-weight polyethylene. The mixture was formed into an ultrahigh-molecular-weight stretched product under the same conditions as in Example 1.

Table 10 indicates dynamic moduli of elasticity, tensile moduli of elasticity, tensile strengths and elongations at break of the filaments obtained at the various stretch ratios.

TABLE 10

| Run No. | Stretch ratio | | | | | |
|---|---|---|---|---|---|---|
| | 8.0 55 | 10.0 56 | 11.8 57 | 14.0 58 | 15.0 59 | 15.7 60 |
| Dynamic modulus of elasticity (GPa) | 48.6 | 73.4 | 89.3 | 94.5 | 110.7 | 114.5 |
| Tensile modulus of elasticity (GPa) | 12.7 | 21.5 | 29.4 | 38.3 | 41.5 | 43.9 |
| Tensile strength (GPa) | 1.37 | 1.62 | 1.83 | 2.06 | 2.34 | 2.37 |
| Elongation at break (%) | 10.5 | 8.2 | 7.6 | 5.8 | 5.7 | 5.5 |

EXAMPLE 11:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 5.0 parts by weight of maleic anhydride and 0.10 part by weight of dicumyl peroxide, per 100 parts by weight of the ultrahigh-molecular-weight polyethylene. The mixture was formed into an ultrahigh-molecular-weight stretched product under the same conditions as in Example 1.

Table 11 indicates dynamic moduli of elasticity, tensile moduli of elasticity, tensile strengths and elongations at break of the filaments obtained at the various stretch ratios.

TABLE 11

| Run No. | Stretch ratio | | | | | |
|---|---|---|---|---|---|---|
| | 8.0 61 | 10.2 62 | 12.1 63 | 14.3 64 | 14.9 65 | 16.7 66 |
| Dynamic modulus of elasticity (GPa) | 51.3 | 74.3 | 96.4 | 107.8 | 113.4 | 127.6 |
| Tensile modulus of elasticity (GPa) | 13.4 | 21.8 | 29.7 | 37.6 | 40.3 | 47.3 |
| Tensile strength (GPa) | 1.42 | 1.73 | 1.90 | 2.05 | 2.13 | 2.24 |
| Elongation at break (%) | 11.5 | 8.4 | 7.6 | 5.9 | 5.8 | 5.6 |

EXAMPLE 12:

[Production of an ultrahigh-molecular-weight polyethylene stretched product]

To a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460) were added 5.0 parts by weight of maleic anhydride and 0.01 part by weight of dicumyl peroxide, per 100 parts by weight of the ultrahigh-molecular-weight polyethylene. The mixture was molded into a film through a T-die and stretched under the following conditions.

A powder of the ultrahigh-molecular-weight polyethylene, pulverized paraffin wax, maleic anhydride and dicumyl peroxide were mixed, and melt-kneaded and pelletized by a screw extruder having a screw diameter of 20 mmφ and an L/D ratio of 20 at a resin temperature of 200° C. The pellets were then molded into a film by a screw extruder having a screw diameter of 20 mmφ and an L/D ratio of 20 and equipped with a coat hanger-type die (lip length 100, lip thickness 0.5 mm) of 230° C. The extruded film was adjusted to a width of 100 mm by using a cold roll cooled by cold water of 20° C. Thereafter, it was stretched by two pairs of snap rolls in a stretching tank (inside temperature 130° C., length 80 cm) using n-decane as a heat medium.

In the stretching operation, the rotating speed of the first snap roll was adjusted to 0.5 m/min. The film was stretched at a stretch ratio of 10.0 by the second snap roll, and subsequently, by properly changing the rotating speed of the third snap roll, stretched tapes having different stretch ratios were obtained. The stretch ratio was calculated from the rotation ratio of the first and third snap rolls.

Table 12 indicates dynamic moduli of elasticity, tensile moduli of elasticity, tensile strengths, elongations at break and widths of the stretched tapes obtained at the various stretch ratios.

TABLE 12

| | Stretch ratio | | | | | |
|---|---|---|---|---|---|---|
| | 8.0 | 14.6 | 20.3 | 30.5 | 36.7 | 42.7 |
| Run No. | 67 | 68 | 69 | 70 | 71 | 72 |
| Dynamic modulus of elasticity (GPa) | 22.5 | 50.0 | 81.7 | 98.5 | 115.3 | 124.7 |
| Tensile modulus of elasticity (GPa) | 4.7 | 12.5 | 26.3 | 36.1 | 42.9 | 45.8 |
| Tensile strength (GPa) | 0.64 | 1.22 | 1.64 | 1.78 | 1.82 | 1.76 |
| Elongation at break (%) | 20.3 | 12.9 | 10.4 | 6.7 | 5.8 | 5.5 |
| Tape width (mm) | 37.8 | 28.4 | 23.2 | 19.7 | 17.4 | 14.8 |

COMPARATIVE EXAMPLE 1:

[Production of ultrahigh-molecular-weight polyethylene stretched product]

Using a 30:70 blend of ultrahigh-molecular-weight polyethylene (Hizex Million ®145M ([η]8.20 dl/g), a trade name for a product of Mitsui Petrochemical Industries, Ltd.) and a paraffin wax (melting point 69° C., molecular weight 460), an ultrahigh-molecular-weight polyethylene stretched product was produced under the same conditions as in Example 1.

Table 13 indicates dynamic moduli of elasticity, tensile moduli of elasticity, tensile strengths and elongations at break at the various streth ratios.

TABLE 13

| | Stretch ratio | | | | | |
|---|---|---|---|---|---|---|
| | 8.0 | 10.0 | 12.0 | 13.9 | 15.1 | 16.2 |
| Run No. | 73 | 74 | 75 | 76 | 77 | 78 |
| Dynamic modulus of elasticity (GPa) | 42.7 | 67.1 | 78.9 | 98.8 | 108.3 | 115.4 |
| Tensile modulus of elasticity (GPa) | 11.8 | 19.7 | 28.0 | 36.2 | 42.7 | 46.3 |
| Tensile strength (GPa) | 1.40 | 1.62 | 1.88 | 2.10 | 2.17 | 2.26 |
| Elongation at break (%) | 11.3 | 8.2 | 6.8 | 5.8 | 5.5 | 5.2 |

COMPARATIVE EXAMPLE 2:

[Production of ultrahigh-molecular-weigh polyethylene stretched product]

Using a 30:70 blend of ultrahigh-molecular-weight polyethylene (Hizex Million ® 145M ([η]8.20 dl/g), a trade name for a product of Mitsui Petrochemical Industries, Ltd.) and a paraffin wax (melting point 69° C., molecular weight 460), an ultrahigh-molecular-weight polyethylene stretched product was produced under the same conditions as in Example 1 except that the resin temperature in the screw extruder was 250° C.

Table 14 indicates dynamic moduli of elasticity, tensile moduli of elasticity, tensile strengths and elongations at break at the various stretch ratios.

TABLE 14

| | Stretch ratio | | | | | |
|---|---|---|---|---|---|---|
| | 8.0 | 10.4 | 12.2 | 14.0 | 14.8 | 15.3 |
| Run No. | 79 | 80 | 81 | 82 | 83 | 84 |
| Dynamic modulus of elasticity (GPa) | 23.8 | 54.8 | 69.3 | 76.5 | 84.3 | 86.1 |
| Tensile modulus of elasticity (GPa) | 6.5 | 16.2 | 21.7 | 25.3 | 26.0 | 27.2 |
| Tensile strength (GPa) | 1.21 | 1.38 | 1.43 | 1.53 | 1.55 | 1.56 |
| Elongation at break (%) | 14.8 | 9.3 | 7.5 | 6.3 | 6.0 | 5.7 |

COMPARATIVE EXAMPLE 3:

[Production of ultrahigh-molecular-weigh polyethylene stretched product]

To a 30:70 blend of ultrahigh-molecular-weight polyethylene (Hizex Million ® 145M ([η]8.20 dl/g), a trade name for a product of Mitsui Petrochemical Industries, Ltd.) and a paraffin wax (melting point 69° C., molecular weight 460), was added 0.01 part by weight, per 100 parts by weight of the ultrahigh-molecular-weight polyethylene, of dicumyl peroxide. The mixture was formed into an ultrahigh-molecular-weight polyethylene stretched product under the same conditions as in Example 1.

Table 15 indicates dynamic moduli of elasticity, tensile moduli of elasticity, tensile strengths and elongations at break at the various stretch ratios.

TABLE 15

| | Stretch ratio | | | | | |
|---|---|---|---|---|---|---|
| | 8.0 | 9.8 | 11.8 | 14.5 | 15.3 | 16.3 |
| Run No. | 85 | 86 | 87 | 88 | 89 | 90 |
| Dynamic modulus of elasticity (GPa) | 54.8 | 64.1 | 84.6 | 108.5 | 107.1 | 115.7 |
| Tensile modulus of elasticity (GPa) | 13.2 | 18.5 | 28.7 | 41.3 | 42.4 | 46.1 |
| Tensile strength (GPa) | 1.46 | 1.62 | 1.88 | 2.07 | 2.16 | 2.18 |
| Elongation at break (%) | 11.4 | 8.4 | 7.5 | 6.0 | 5.8 | 5.4 |

EXAMPLE 13:

[Determination of an amount of maleic anhydride grafted to an ultrahigh-molecular-weight polyjethylene by measuring an infrared absorption spectrum]

An amount of maleic anhydride grafted to an ultrahigh-molecular-weight polyethylene in Examples 1–12 was determined by the following operation.

Ten grams of the molten strand extruded from the screw extruder in each of Examples 1–12 was dissolved in 1 l of p-xylene at 130° C. and then precipitated in excess methanol. No insoluble gel product was found in any of all the Examples of this invention. In order to remove the unreacted maleic anhydride, the precipitate was further washed with methanol. For removing the paraffin wax from the precipitate, said precipitate was washed with excess hexane and then dried overnight with a vacuum drier. The resulting sample was compression molded at 200° C. to obtain a film for measuring an infrared absorption spectrum.

The infrared absorption spectrum was measured by means of a Fourier transformation infrared spectrophotometer (FTS-20E Model, supplied by Diglab Company). As for the sample wherein maleic anhydride was grafted to the ultrahigh-molecular-weight polyethylene, absorption at 1790 cm$^{-1}$ ascribable to a carbonyl group of succinic anhydride was observed. Absorbance $D_{1790}$ of 1790 cm$^{-1}$ was corrected with a film thickness 1 (mm) and the results are shown in Table 16. In said Table 16, the amount of maleic anhydride grafted was calculated by the following equation.

Amount (wt.%) of maleic anhydride grafted=0.233 $D_{1790}/1$ +0.002

With respect to Comparative Examples 1-3, samples were prepared in like manner for measuring the infrared absorption spectrum. However, no absorption at 1790 cm$^{-1}$ was observed in any instance.

TABLE 16

| Sample | $D_{1790}/1$ | Amount of maleic anhydride grafted (wt. %) |
|---|---|---|
| Example 1 | 0.03 | 0.009 |
| Example 2 | 0.07 | 0.018 |
| Example 3 | 1.83 | 0.428 |
| Example 4 | 1.97 | 0.461 |
| Example 5 | 2.25 | 0.526 |
| Example 6 | 2.54 | 0.594 |
| Example 7 | 0.87 | 0.205 |
| Example 8 | 0.95 | 0.223 |
| Example 9 | 1.27 | 0.298 |
| Example 10 | 1.43 | 0.335 |
| Example 11 | 1.73 | 0.405 |
| Example 12 | 1.89 | 0.442 |
| Comparative Example 1 | 0 | 0 |
| Comparative Example 2 | 0 | 0 |
| Comparative Example 3 | 0 | 0 |

Figure 2:
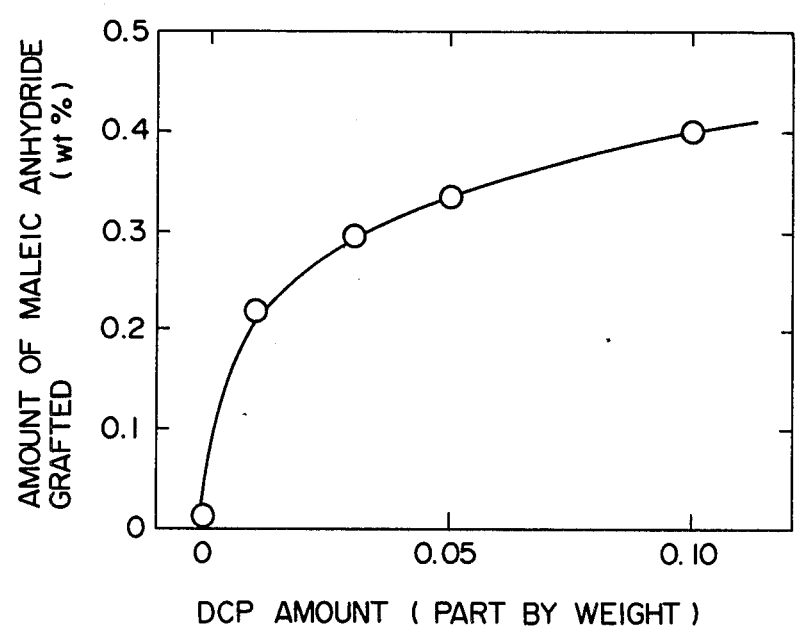
FIG. 2 is a graphical representation of a typical relationship between amount of maleic anhydride grafted to high-molecular-weight polyethylene and amount of dicumyl peroxide.

To examine change in amount of maleic anhydride grafted to an ultrahigh-molecular-weight polyethylene under respective molding conditions, the amount of maleic anhydride grafted in Table 16 was plotted against the melt-kneading temperature in FIG. 1. By increasing the amount of maleic anhydride from 1.0 part by weight to 5.0 parts by weight, the amount of maleic anhydride grafted tends to somewhat increase, but it depends greatly on the melt-kneading temperature as shown in FIG. 1. Moreover, to examine an effect brought forth by conjointly using dicumyl peroxide, the amount of maleic anhydride in case of adding 5 parts by weight of maleic anhydride and melt-kneading the mixture at 200° C. was plotted against the amount of dicumyl peroxide (DCP) in FIG. 2. It is thus found that the amount of maleic anhydride grafted can be increased by using dicumyl peroxide conjointly with maleic anhydride.

EXAMPLE 14

[Evaluation of adhesion between a stretched filament and a thermosetting epoxy resin]

Adhesion between the stretched filament produced in each of Examples 1-12 and Comparative Examples 1-3 and the thermosetting epoxy resin was evaluated by the following operation. As for the stretched tape in Example 12, a sample was evaluated by tearing it into a strip 5 mm wide.

Figure 3:
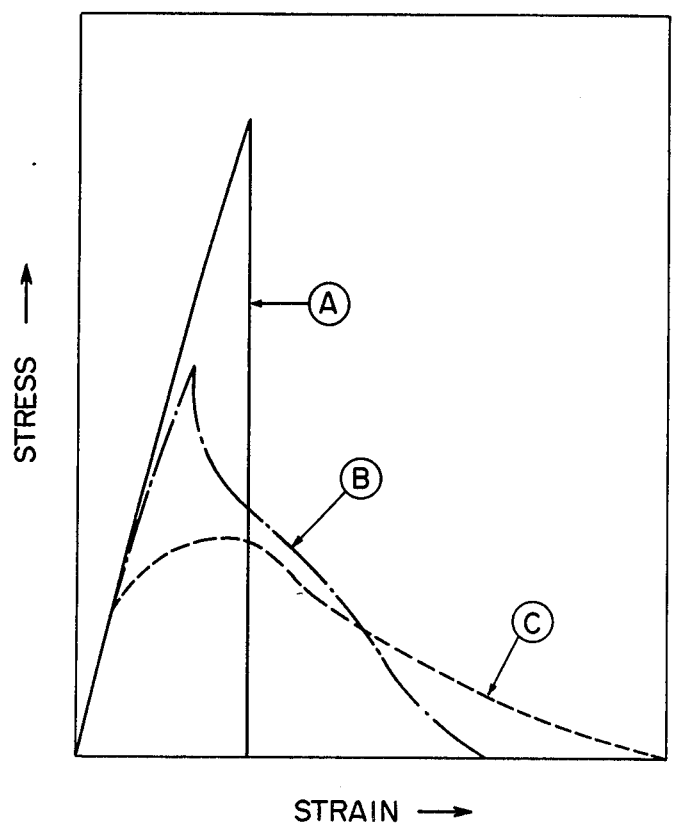
FIG. 3 is a graphical representation of a stress-strain curve at the test to pull the ultrahigh-molecular-weight polyethylene stretched product from the thermosetting epoxy resin.

Araldite ® rapid (rapid-setting type, a trade name for a product of Ciba Geiby AG) was used as a thermosetting epoxy resin. One end each of the stretched filaments, 3 cm long, was embedded in the thermosetting epoxy resin, left in an oven of 80° C. for 2 hours and set. For evaluating whether the stretched filament was adhered to the thermosetting epoxy resin, a test of pulling the stretched filament was conducted at room temperature (23° C.) by means of an Instron Universal tester (Model 1123, supplied by Instron Company). At this time, the length of the sample between clamps was 50 mm and the speed of pulling 50 mm/min. As a result of the pulling test, stress-strain curves were grouped into three types shown in FIG. 3: A type wherein the stretched filament is broken because the stretched filament is completely adhered to the thermosetting epoxy resin, B type wherein both are partially adhered to each other but cannot stand a pulling stress and pulling occurs, and C type wherein no adhesion occurs and the stretched filament is pulled.

Figure 4:
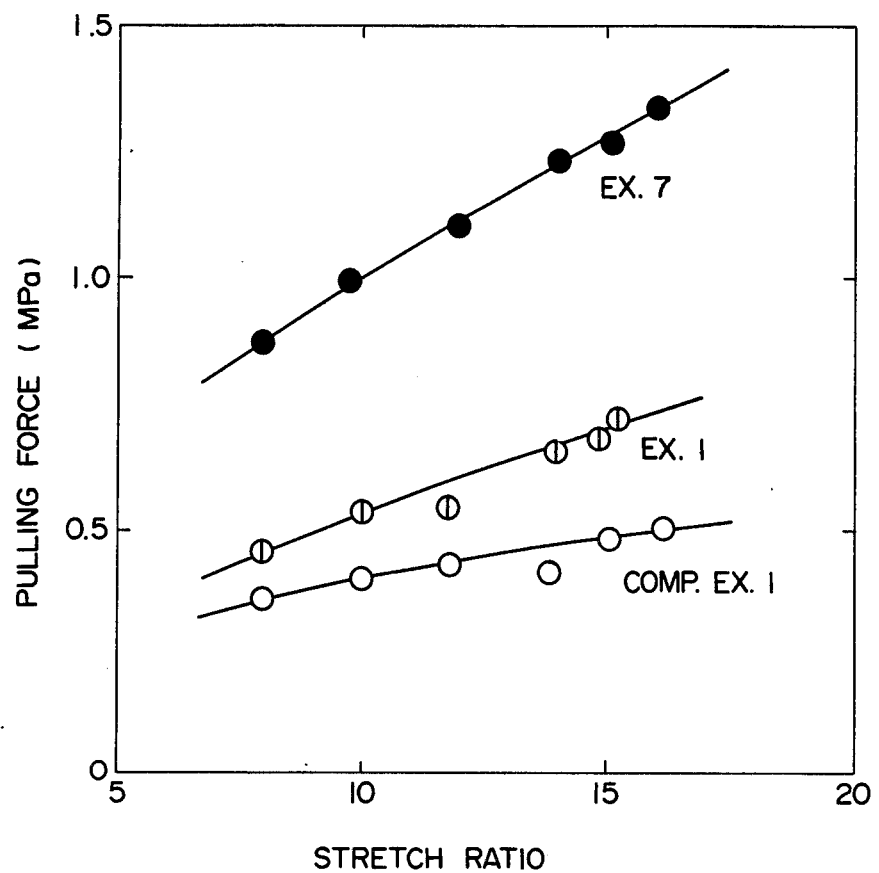
FIG. 4 is a graphical representation of a relationship between a force of pulling the ultrahigh-molecular-weight polyethylene stretched product from the thermosetting epoxy resin and a stretch ratio.

The adhesion of the stretched filament produced in each of Examples 1-11 and Comparative Examples 1-3 was evaluated as shown in Table 17 depending on the difference in stress-strain curve of the above-described pulling test. Assuming the stretched filament was of circular section, a surface area S of adhesion between the stretched filament and the thermosetting epoxy resin and a maximum stress value F of the stress-strain curve were found and a pulling force $\sigma p(=F/S)$ of pulling the stretched filament from the thermosetting epoxy resin was obtained. The results in Examples 1 & 7 and Comparative Example 1 are summarized in Tables 18, 19 and 20. As for the results in Example 7, since the stretched filament was not pulled from the thermosetting epoxy resin and broken, a presumed value was described as the pulling force. In FIG. 4, the pulling force was plotted against the stretch ratio.

From the foregoing results, it follows that in Comparative Example 1, the adhesion is not observed between the stretched filament and the thermosetting epoxy resin, while in Example 1 where the small amount of maleic anhydride is added the improvement of the adhesion is ascertained. It is moreover found that in the stretched filament in Example 3 no pulling of the stretched filament occurs and said stretched filament is completely adhered to the thermosetting epoxy resin.

TABLE 17

| Sample | Adhesion |
|---|---|
| Example 1 | B |
| Example 2 | B |
| Example 3 | A |
| Example 4 | A |
| Example 5 | A |
| Example 6 | A |
| Example 7 | A |
| Example 8 | A |
| Example 9 | A |
| Example 10 | A |
| Example 11 | A |
| Example 12 | A |
| Comparative Example 1 | C |
| Comparative Example 2 | C |
| Comparative Example 3 | C |

TABLE 18

| | Stretch ratio | | | | | |
|---|---|---|---|---|---|---|
| Example 1 | 8.0 | 10.0 | 11.8 | 14.0 | 14.9 | 16.3 |
| Pulling force (MPa) | 0.45 | 0.53 | 0.54 | 0.65 | 0.68 | 0.72 |

TABLE 19

| | Stretch ratio | | | | | |
|---|---|---|---|---|---|---|
| Example 7 | 8.0 | 9.8 | 12.0 | 14.1 | 15.2 | 16.1 |
| Pulling force (MPa) | 0.87< | 0.99< | 1.10< | 1.23< | 1.27< | 1.34< |

TABLE 20

| Comparative | Stretch ratio | | | | | |
|---|---|---|---|---|---|---|
| Example 1 | 8.0 | 10.0 | 12.0 | 13.9 | 15.1 | 16.2 |
| Pulling force (MPa) | 0.36 | 0.40 | 0.43 | 0.41 | 0.48 | 0.50 |

What is claimed is:

1. A graft-modified ultrahigh-molecular-weight polyethylene obtained by grafting (A) an ultrahigh-molecular-weight polyethylene having an inherent viscosity $[\eta]$, determined at 135° C. in decalin, of at least 5 dl/g with (C) an unsaturated carboxylic acid graft-copolymerizable therewith or its graft-copolymerizable derivative, under melt-kneading condition in the presence of (B) an aliphatic compound having a melting point, determined by the DSC method, of at least 10° C. and a boiling point of at least 130° C. an amount of the component (C) grafted in said graft-modified ultrahigh-molecular-weight polyethylene being 0.01 to 10% by weight, and said graft-modified ultrahigh-molecular-weight polyethylene being substantially free of an insoluble gel product and having a tensile strength of at least 1.0 GPa.

2. The graft-modified ultrahigh-molecular-weight polyethylene of claim 1 having a tensile modulus of elasticity of at least 10 GPa.

3. The graft-modified ultrahigh-molecular-weight polyethylene of claim 1 or 2 being in the form of a stretched shaped article.

4. The graft-modified ultrahigh-molecular-weight polyethylene of claim 1 wherein the amount of the component (C) grafted is 0.05 to 10% by weight.

5. The graft-modified ultrahigh-molecular-weight polyethylene of claim 1 wherein the component (C) is a $C_3$-$C_{15}$ unsaturated dicarboxylic acid or an acid anhydride thereof.

6. The graft-modified ultrahigh-molecular-weight polyethylene of claim 1 wherein the component (B) is a paraffinic wax having a melting point, determined by the DSC method, of 40° to 120° C. and a weight average molecular weight ($\overline{M}w$), determined by the GPC method, of at least 230 but less than 2,000.

7. The graft-modified ultrahigh-molecular-weight polyethylene of claim 1 wherein the component (B) is an aliphatic compound having 12 to 50 carbon atoms and a molecular weight of 30 to 2,000, selected from the group consisting of aliphatic carboxylic acids, aliphatic alcohols, aliphatic acid amides, aliphatic carboxylic acid esters, aliphatic mercaptans, aliphatic aldehydes and aliphatic ketones.

8. The graft-modified ultrahigh-molecular-weight polyethylene of claim 1 wherein an inherent viscosity $[\eta]$ of the component (A) is 5 to 30 dl/g.

9. The graft-modified ultrahigh-molecular-weight polyethylene of claim 6 wherein the weight average molecular weight ($\overline{M}w$) of the paraffinic wax is at least 230 but less than 1,000.

10. The graft-modified ultrahigh-molecular-weight polyethylene of claim 6 wherein the melting point of the paraffinic wax is 45° to 110° C.

11. A process for producing a graft-modified ultrahigh-molecular-weight polyethylene of claim 1, which comprises
   (1) melt-kneading a mixture composed of (A) 15 to 80 parts by weight, per 100 parts by weight of the components (A) and (B) combined, of an ultrahigh-molecular-weight polyethylene having an inherent viscosity $[\eta]$, determined at 135° C. in decalin, of at least 5 dl/g, (B) 85 to 20 parts by weight, per 100 parts by weight of the components (A) and (B) combined, of an aliphatic compound having a melting point, determined by the DSC method, of at least 10° C. and boiling point of at least 130° C., and (C) at least 0.1 part by weight, per 100 parts by weight of the component (A), of an unsaturated carboxylic acid graft-copolymerizable with the component (A) or its graft-copolymerizable derivative, in a screw extruder while maintaining the temperature of the mixture at a temperature ranging from a melting point of the mixture to 280° C., and
   (2) melt-extruding the molten mixture through a die kept at a temperature ranging from the melting point of the mixture to 300° C.

12. The process of claim 11 which further comprises
   (3) cooling the resulting unstretched extrudate to solidify it, and
   (4) subjecting the unstretched solidifed extrudate to a stretching treatment at a temperature ranging from the melting point, determined by the DSC method, of the component (B) to a point 20° C. above the melting point of the mixture at a stretch ratio of at least about 3:1 when step (2) is carried out while a draft is applied to the unstretched extrudate or at a stretch ratio of at least about 10:1 when step (2) is carried out in the absence of a draft.

* * * * *